(No Model.)
J. R. DEISHER.
NUT LOCKING DEVICE.
No. 511,880. Patented Jan. 2, 1894.
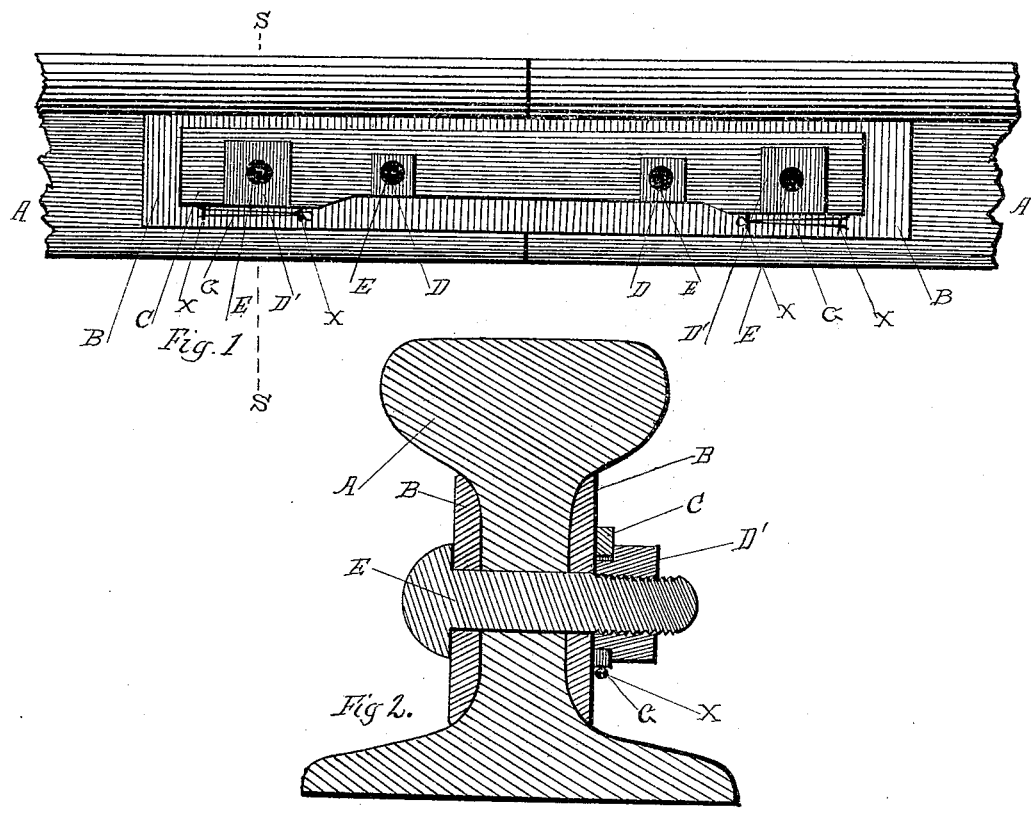
Witnesses
A H Rosengarten
S. R. Beddall
Inventor
John R. Deisher
By his Attorney
Horace B. McCool

UNITED STATES PATENT OFFICE.

JOHN R. DEISHER, OF POTTSVILLE, PENNSYLVANIA, ASSIGNOR OF ONE-HALF TO ARTHUR H. ROSENGARTEN, OF SAME PLACE.

NUT-LOCKING DEVICE.

SPECIFICATION forming part of Letters Patent No. 511,880, dated January 2, 1894.

Application filed May 1, 1893. Serial No. 472,472. (No model.)

*To all whom it may concern:*

Be it known that I, JOHN ROBERT DEISHER, a citizen of the United States, residing at Pottsville, in the county of Schuylkill and State of Pennsylvania, have invented certain new and useful Improvements in Nut-Locking Devices; and I do hereby declare the following to be a full, clear, and exact description of the invention, such as will enable others skilled in the art to which it appertains to make and use the same.

My invention relates to devices for securing or locking nuts on bolts so that they will not work loose or come off of the bolt unless intentionally taken off, and my object is to provide a nut locking device whereby two or more nuts may be so effectually locked that they can not be loosened until my device is removed.

My invention is intended to be applied where two or more nuts are to be locked and I have particularly designed it for use on railroad joints.

I attain my object by use of the device shown in the accompanying drawings, in which similar letters indicate like parts in all the views.

Figure 1 shows a vertical side view of a railroad rail joint having my nut locking device attached. Fig. 2 is a vertical sectional view or cross section of Fig. 1 through the line —S—S—. Fig. 3 is a front view of the locking plate C.

A—A— represent the rails, B—B— the fish plates, C— the nut locking plate, D—D— ordinary standard nuts to fit the track bolts E—E—.

D' D' are double nuts the inner part being of a size to correspond with the nuts D—D— while the outer portion is larger, forming a flange fitting over and holding in place the nut locking plate —C—, as is shown in Fig. 2.

X—X—X—X— are eyes formed in or secured to the plate C in which are placed the spring cotters G—G—.

The slots in the plate C— are all of the same size and the double nuts D'—D'— may be used on any of the bolts.

After the nuts are all snugly screwed up against the fish plate, the plate C is dropped over the nuts and the spring cotters placed in the eyes X—X—X—X—, when it will be readily seen that the flanged fronts of the nuts D' D' and the spring cotters firmly secure it in position. None of the nuts can then work loose or be removed so long as the plate C— is in place, yet the plate C can be readily removed and used over and over again.

As a matter of economy I prefer to use but two flanged nuts D'—D'— on each track joint but I do not confine myself to the use of that number. All may be flanged if so desired and they may be on any of the bolts desired.

What I claim, and desire to secure by Letters Patent, is—

In the nut locking device for railroad rail joints hereinbefore shown and described, the combination of the slotted nut locking plate C, adapted to fit over the bolts E E E E, the flanged or double nuts D'—D'— and the standard nuts D—D— fitting the bolts E E E E, the spring cotters G—G— fitting in the eyes X—X—X—X— which are formed in or secured to the nut locking plate C, with the fish plates B—B— and rails A—A— substantially as and for the purpose set forth.

In testimony whereof I have affixed my signature in presence of two witnesses.

JOHN R. DEISHER.

Witnesses:
J. G. SMITH,
F. P. ROSENGARTEN.